United States Patent
DeLuca

(10) Patent No.: US 10,123,169 B2
(45) Date of Patent: Nov. 6, 2018

(54) GROUP INFERENCE BASED UPON VENUE ZONE EVENTS

(71) Applicant: International Business Machines Corporation, Armonk, NY (US)

(72) Inventor: Lisa Seacat DeLuca, Baltimore, MD (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 34 days.

(21) Appl. No.: 14/968,777

(22) Filed: Dec. 14, 2015

(65) Prior Publication Data
US 2017/0171709 A1    Jun. 15, 2017

(51) Int. Cl.
H04W 4/02    (2018.01)
G06N 5/04    (2006.01)
H04W 4/06    (2009.01)

(52) U.S. Cl.
CPC ............ H04W 4/023 (2013.01); G06N 5/048 (2013.01); H04W 4/06 (2013.01)

(58) Field of Classification Search
CPC ..... H04L 67/306; H04L 43/16; H04L 41/142; H04L 43/04; H04L 67/22; H04L 67/30; G06Q 30/0261; G06Q 30/0267; G06Q 30/0269; G06Q 30/0277; G06N 5/04; G06N 5/022; G06N 5/025; G06N 3/08; G06N 5/047; G06N 5/048; G06N 3/063; H04W 4/025; H04W 4/028; H04W 4/021; H04W 4/04; H04W 4/206; H04W 64/00; H04W 4/023; H04W 4/06
See application file for complete search history.

(56) References Cited

U.S. PATENT DOCUMENTS

| | | | |
|---|---|---|---|
| 7,627,502 B2 | 12/2009 | Cheng et al. |
| 8,560,357 B2 | 10/2013 | Sickenius |
| 8,725,567 B2 | 5/2014 | Huang et al. |
| 8,825,526 B2 | 9/2014 | Peters et al. |
| 2003/0154135 A1 | 8/2003 | Covington et al. |
| 2005/0147072 A1 | 7/2005 | Mahendran et al. |

(Continued)

FOREIGN PATENT DOCUMENTS

| | | |
|---|---|---|
| WO | 2011129865 A2 | 10/2011 |
| WO | 2015070683 A1 | 5/2015 |
| WO | WO 2015070683 A1 * | 5/2015 ............. H04L 67/22 |

OTHER PUBLICATIONS

Clifford et al. (Attention, Shoppers: Store Is Tracking Your Cell, Business Day, The New York Times, Jul. 14, 2013).*

(Continued)

*Primary Examiner* — Christopher M Brandt
*Assistant Examiner* — Jing Gao
(74) *Attorney, Agent, or Firm* — Lee Law, PLLC; Christopher B. Lee

(57) ABSTRACT

Zone events are tracked within a venue. The zone events represent relative movements and dwelling times of multiple mobile devices within the venue as users of the respective mobile devices move and dwell among and within multiple configured zones of the venue. A relationship is inferred between at least two of the users responsive to a configured zone event threshold being satisfied by the tracked zone events that represent the relative movements and dwelling times of the mobile devices of the at least two users.

20 Claims, 5 Drawing Sheets

(56) References Cited

U.S. PATENT DOCUMENTS

| | | | |
|---|---|---|---|
| 2008/0294487 A1* | 11/2008 | Nasser | G06Q 30/02 705/7.32 |
| 2009/0094260 A1 | 4/2009 | Cheng et al. | |
| 2011/0029370 A1 | 2/2011 | Roeding et al. | |
| 2012/0030011 A1 | 2/2012 | Rey et al. | |
| 2012/0166533 A1 | 6/2012 | Rubinstein et al. | |
| 2012/0233015 A1 | 9/2012 | Calman et al. | |
| 2013/0282438 A1 | 10/2013 | Hunter et al. | |
| 2013/0297422 A1 | 11/2013 | Hunter et al. | |
| 2013/0325399 A1* | 12/2013 | Yuen | A61B 5/0002 702/178 |
| 2014/0136318 A1 | 5/2014 | Alberth, Jr. et al. | |
| 2014/0161316 A1 | 6/2014 | Golan et al. | |
| 2014/0200956 A1 | 7/2014 | Gerszberg | |
| 2015/0178739 A1 | 6/2015 | Ghosh et al. | |
| 2016/0048859 A1* | 2/2016 | Doron | G06Q 30/0205 705/7.34 |

OTHER PUBLICATIONS

Cheng et al., Inferring User Relationship from Hidden Information in WLANs, In Proceedings of 2012 Military Communications Conference, Oct. 29-Nov. 1, 2012, pp. 1-6 (plus 1 citation page), IEEE, Orlando, FL.*

Author Unknown, Providing Personalized In-Store Navigation Based on Historical and Demographic Data, Technical Disclosure IPCOM000242318D, Jul. 6, 2015, pp. 1-4, IP.com, Inc., Published at: https://priorart.ip.com/IPCOM/000242318.

Author Unknown, Enabling Users to Collaborate on Gifting to Friends, Technical Disclosure IPCOM000236956D, May 23, 2014, pp. 1-3, IP.com, Inc., Published at: https://priorart.ip.com/IPCOM/00236956.

Author Unknown, CitiBike: Bike share data in New York, animated, flowingdata.com, Apr. 1, 2014, pp. 1-2, FlowingData, Published online at: http://flowingdata.com/2014/04/01/bike-share-data-in-new-york/.

Stephanie Clifford, et al., Attention, Shoppers: Store Is Tracking Your Cell, The New York Times, NYTimes.com, Jul. 14, 2013, pp. 1-4, The New York Times Company, Published online at: http://www.nytimes.com/2013/07/15/business/attention-shopper-stores-are-tracking-your-cell.html?pagewanted=all&_r=0.

Author Unknown, IBM Cloud: Catalog, IBM.com, Printed from website on May 11, 2015, pp. 1-2, IBM Corporation, Published online at: http://www.ibm.com/cloud-computing/us/en/catalog.html#IBM_Platform_Big-Data.

Author Unknown, re:log: Tracking the Movements of Conference Attendees via WiFi, infosthetics.com, Jun. 18, 2013, pp. 1-2, Information Aesthetics, Published online at: http://infosthetics.com/archives/2013/06/relog_tracking_the_movements_of_conference_attendees_via_wifi.html.

Author Unknown, re:log: Besucherstromanalyse per re:publica W-LAN (English translation not available), ppendatacity.de, Printed from website on May 11, 2015, pp. 1-2, OpenDataCity, Published online at: http://apps.ppendatacity.de/relog/.

Barbara Thau, How Big Data Helps Stores Like Macy's and Kohl's Track You Like Never Before, Forbes, Jan. 24, 2014, pp. 1-6, Forbes, Inc., Published online at: http://www.forbes.com/sites/barbarathau/2014/01/24/why-the-smart-use-of-big-data-will-transform-the-retail-industry/.

Author Unknown, People counter, Wikipedia, the free encyclopedia, Oct. 20, 2015, pp. 1-5, Wikimedia Foundation, Inc., Published at: https://en.wikipedia.org/wiki/People_counter.

Richard Finnie, Time is money! The impact of customer "Dwell Time" on Retail Sales, LinkedIn.com Pulse, Aug. 7, 2014, pp. 1-2, LinkedIn Corporation, Published at: https://www.linkedin.com/pulse/20140807162720-258558574-time-is-money-the-impact-of-customer-dwell-time-on-retail-sales.

Ningning Cheng, et al., Inferring User Relationship from Hidden Information in WLANs, In Proceedings of 2012 Military Communications Conference, Oct. 29-Nov. 1, 2012, pp. 1-6 (plus 1 citation page), IEEE, Orlando, FL.

Ashkan Soltani, et al., New documents show how the NSA infers relationships based on mobile location data, The Switch, Dec. 10, 2013, pp. 1-10, The Washington Post, Published at: http://www.washingtonpost.com/blogs/the-switch/wp/2013/12/10/new-documents-show-how-the-nsa-infers-relationships-based-on-mobile-location-data/.

Author Unknown, Function to calculate distance between two coordinates shows wrong, Blog, Last edited Jul. 18, 2014, pp. 1-3, Stack Overflow, Published at: http://stackoverflow.com/questions/18883601/function-to-calculate-distance-between-two-coordinates-shows-wrong.

* cited by examiner

GROUP INFERENCE BASED UPON VENUE ZONE EVENTS

BACKGROUND

The present invention relates to automated determination of interpersonal groups according to wireless device dwell and movement events within a venue. More particularly, the present invention relates to group inference based upon venue zone events.

Users of mobile devices may carry the mobile devices with them as they travel during a course of any given day. The users may use the mobile devices to make telephone calls, to send and receive electronic mail messages (email), and to connect to Internet-based websites from any location that has suitable wireless network connectivity or Wireless Fidelity (Wi-Fi) connectivity for the communication platform(s) supported by the respective mobile devices.

SUMMARY

A computer-implemented method includes tracking, within a venue by a processor, zone events that represent relative movements and dwelling times of multiple mobile devices within the venue as users of the respective mobile devices move and dwell among and within multiple configured zones of the venue; and inferring a relationship between at least two of the users responsive to a configured zone event threshold being satisfied by the tracked zone events that represent the relative movements and dwelling times of the mobile devices of the at least two users.

A system that performs the computer-implemented method and a computer program product that causes a computer to perform the computer-implemented method are also described.

DETAILED DESCRIPTION

Figure 1:
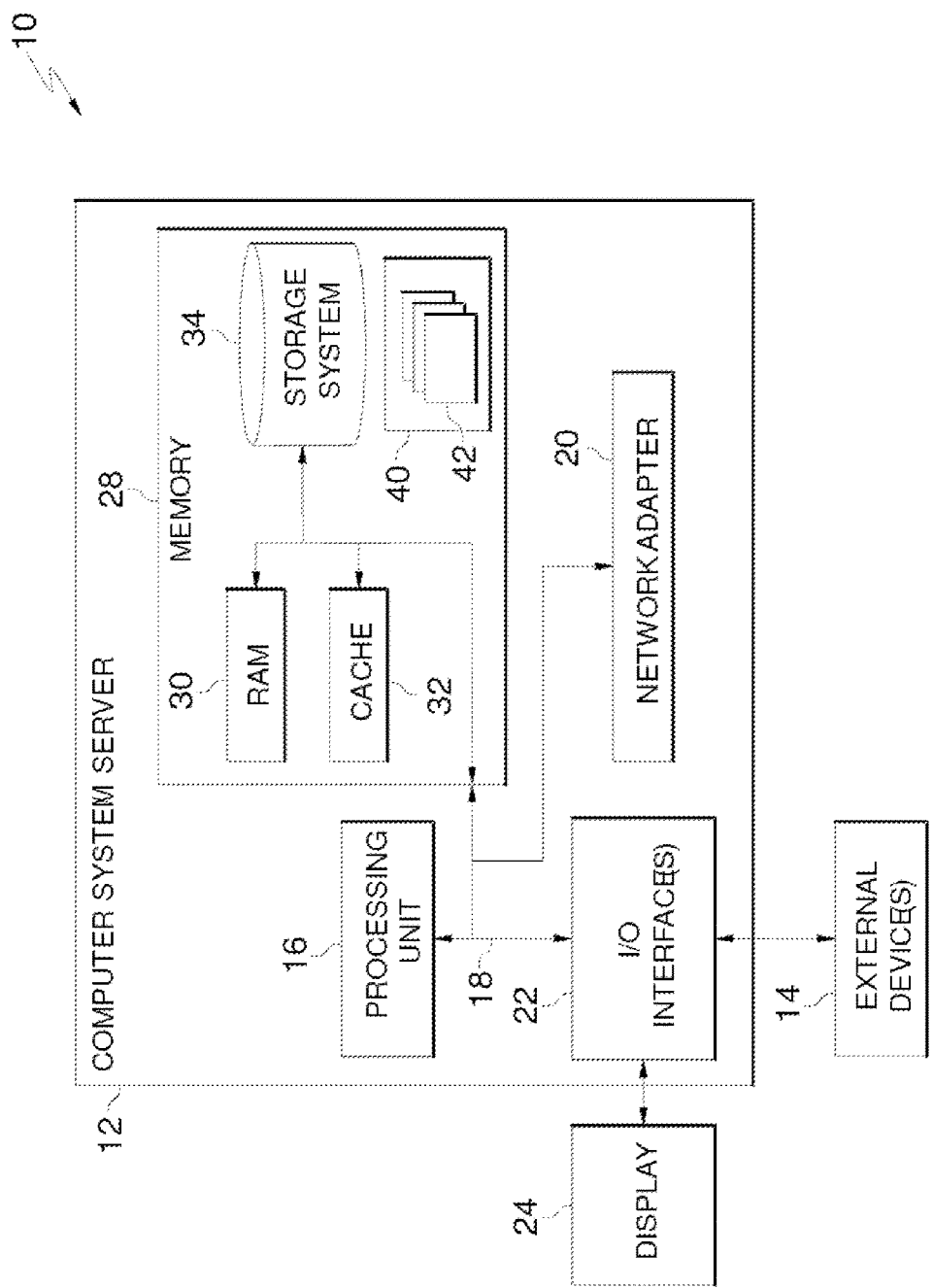
FIG. 1 depicts a cloud computing node according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides group inference based upon venue zone events. The present technology solves a recognized venue location-based group identification problem by providing technology that includes a new form of detection of relationships between users of mobile devices. The technology tracks several venue zone-based events associated with mobile devices carried by users within one or more venues. For example, the technology tracks mobile devices as the respective users enter into venue zones, tracks mobile devices as the respective users move within venue zones, tracks mobile devices as the respective users stay/dwell at different locations within venue zones, and tracks mobile devices as the respective users move between/among venue zones within a particular venue. From this information, the technology may then infer user relationships, such as interpersonal groups (e.g., friends, family, etc.). As such, the present technology may infer groups of users from their respective and related movements (e.g., similar browsing patterns) within one or more venues in accordance with locations and movements of their respective mobile devices as the users move and dwell together within the venue(s).

For purpose of the present description, a "venue" may include any location that may be configured with zones using short-distance wireless device location detection technology (e.g., Bluetooth low energy (BLE) or other hotspot beacons, triangulation, proximity, etc.), such as a sports coliseum, a store, a shopping mall, a food court within a shopping mall, or other type of area where people gather and move among different locations within the area. A venue "zone" may include an area or region of a venue, such as a food court/cafeteria or soda shop within a shopping mall or sports stadium, a section of a department store (e.g., clothing, shoes, etc.), an arcade, or other area/region that may be configured with short-distance wireless device location detection technology to detect movement among and within the respective area/region, and users dwelling within that area/region.

A venue "zone event" refers to detection of a mobile device (and thereby the respective user carrying the mobile device) entering, moving within, dwelling at a location within, and leaving a particular venue zone. Multiple different forms of zone events may be configured as granularly as appropriate for the particular zone according to size and other factors related to the particular zone (e.g., number and proximity of shelving or display units, etc.). The terms "dwell" and "dwell time" refer to a user of a mobile device being detected as remaining in a particular location/zone for a particular duration of time. The term "dwell pattern" refers to coincident dwell times within venue zones of different mobile device users. The term "browsing patterns" refers collectively to coincident movements within and among venue zones in combination with dwell patterns of different mobile device users as they journey through a venue. Additionally, the term "related" for purposes of inference of groups based upon venue zone events refers to users being friends, acquaintances, family members, or having any other relationship where the users know one another and/or develop a relationship during a course of coincident browsing patterns within a venue (e.g., talking about an item and realizing common interests that result in an interpersonal relationship, etc.).

The technology described herein operates by tracking, within a venue, zone events that represent relative movements and dwelling times of multiple mobile devices within the venue as users of the respective mobile devices move and dwell among and within multiple configured zones of the venue. The technology further operates by inferring a relationship between at least two of the users responsive to a configured zone event threshold being satisfied by the tracked zone events that represent the relative movements and dwelling times of the mobile devices of the at least two users.

The present technology analyzes movements and dwelling patterns of mobile device user's as they enter, exit, and remain within one or more venues and/or zones to determine how long different users stand (e.g., dwell/remain/stay) in certain areas of the venues and the respective users' movement patterns within the venues relative to other users. This dwell and movement information of different users may be used to determine a likelihood or probability of different users being related. It should be noted that the users may be provided with an opportunity to "opt in" to the location tracking technology described herein.

A number of preferences regarding when to "infer" a relationship between or among a group of different users may be established and configured. For example, a threshold zone entry time may be established, such that different users entering a zone within a configured time of each other may be inferred to be related (e.g., users entering a zone within one (1) minute of each other, within five (5) minutes of each other, etc.). If the users enter a zone within the configured threshold zone entry time, the users may be inferred to be related.

Further, a threshold zone exit time may be established, such that different users exiting a zone within a configured time of each other may be inferred to be related (e.g., users exiting a zone within one (1) minute of each other, within five (5) minutes of each other, etc.). If the users exit a zone within the configured threshold zone exit time, the users may be inferred to be related.

Additionally, a threshold distance of movement over time may be established, such that different users remaining within a configured distance of each other as they move among/between and/or within zones may be used to infer a relationship between the users (e.g., users remaining within ten (10) feet of each other, within five (5) feet of each other, etc.). If the users remain within the configured threshold distance while moving, the users may be inferred to be related.

Additionally, a threshold number of similar movements may be established, such as a number of times that different users move together among or within zones (e.g., one (1) time, two (2) times, three (3) times, etc.). If the users move together more than the configured threshold number of similar movements, the users may be inferred to be related.

Further, a threshold shared dwell time may be established, such as an amount of time different users remain near one another within a zone (e.g., dwell for over five (5) minutes, ten (10) minutes, etc.). If the users dwell together more than the configured threshold shared dwell time, the users may be inferred to be related.

As another alternative, a threshold number of common zones at common times may be established, such as a number of time different users enter the same zones during the course of their respective time at a venue during the same time intervals (e.g., ten (10) or more total zones visited by each of different users, with (6) zone visits occurring at the same time, etc.). As such, if two users are shopping together and also have their own browsing habits, but tend to meet each other throughout the shopping trip routinely more than the configured threshold number of common zones at common times, the users may be inferred to be related.

It should be understood that many other possibilities exist for configuring threshold preferences as appropriate for a given venue. Any such possibilities are considered to be within the scope of the present subject matter.

Once any of the configured thresholds is met, the relationship between the users may be documented and stored. The documented relationship may be used to provide promotions or other benefits to the respective users. The relationship may be further shared with marketing teams for additional promotions/offers based upon the inferred relationship.

For example, a push notification may be sent to one or more of the related users, such as to notify one of the related users that another of the related users is interested in an item. A coupon/discount may be provided to the notified user, and this user may then either obtain the item for the other related user or may assist the related user with the benefit of the coupon/discount in purchasing the item of interest to the other user. Again, many possibilities exist for use of the inferred groups based upon venue zone events described herein, and all such possibilities are considered within the scope of the present description.

As such, the present technology may identify related users (groups) according to venue zone events that may not otherwise be detectable. The technology may additionally provide notifications and improve benefits derived from the users' group relations.

It should be noted that conception of the present subject matter resulted from recognition of certain limitations associated with identification of relationships between people. For example, it was observed that it would be beneficial to users, such as shoppers, sports fans, and other people, to have their relationships inferred and to be provided with benefits (reminders such as birthdays, anniversaries, etc.; promotions; and other benefits) that are of relevance to their relationships with other people. It was further determined that absolute location technologies, such as global positioning system (GPS), was not capable of discerning zones within venues because these technologies rely upon absolute location and do not include a sensor that may be placed within a venue to detect movement of mobile devices near the sensor. Further, it was determined that short-distance wireless device location detection technology, as described above, may be positioned within and/or at boundaries of locations in a venue to define zones within the venue, and to detect mobile device movement and dwelling near or within the defined zones. The present subject matter improves inference of groups by providing for automated group inference based upon venue zone events, as described above and in more detail below. As such, improved inference of groups may be obtained through use of the present technology.

The group inference based upon venue zone events described herein may be performed in real time to allow prompt identification of groups of mobile device users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additionally, the present technology may be implemented within or as part of a cloud computing environment (e.g., for data analytics), or may be implemented as a customized retail-environment specific solution. As such, examples of implementations for both environments are included herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
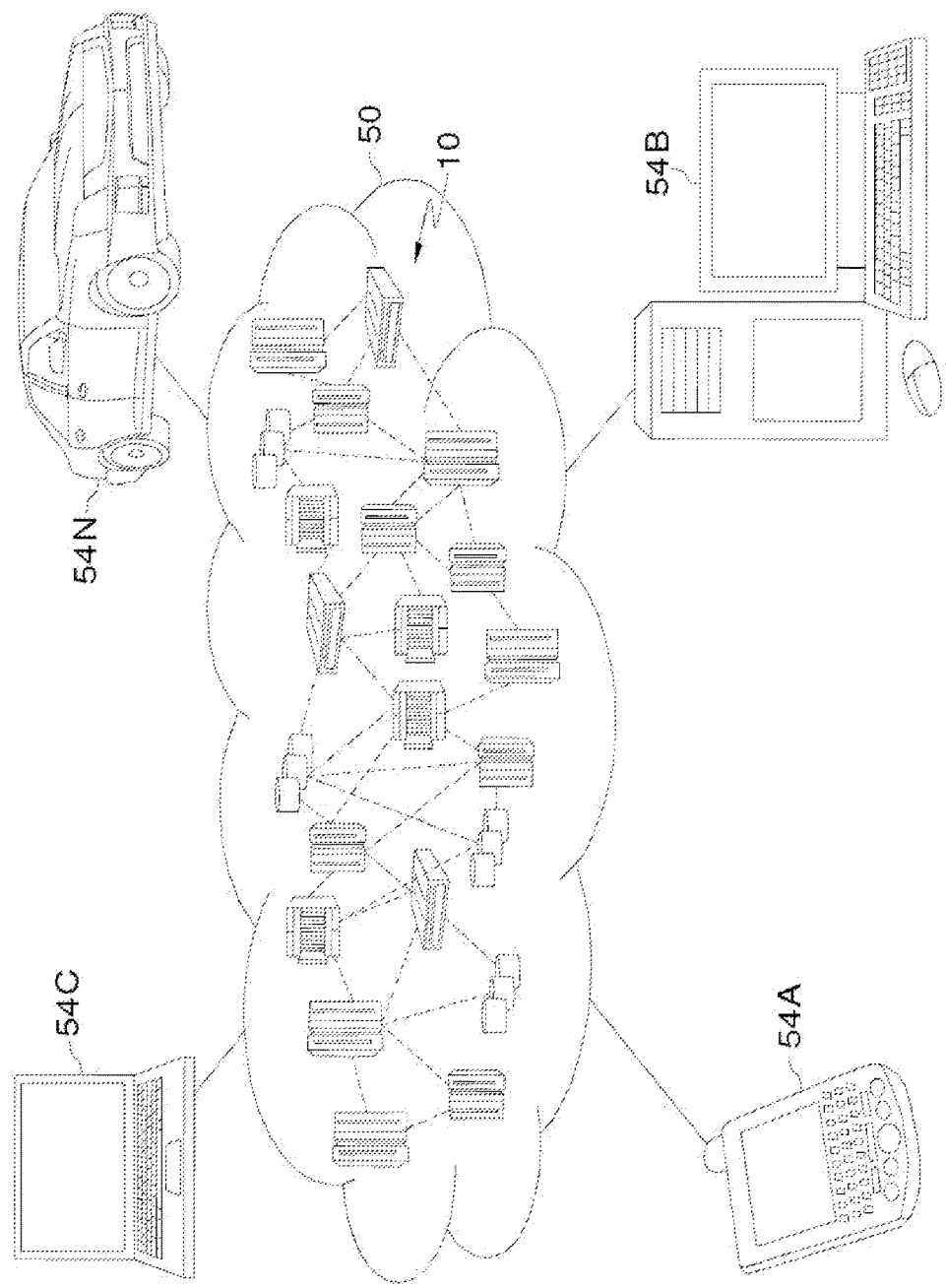
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
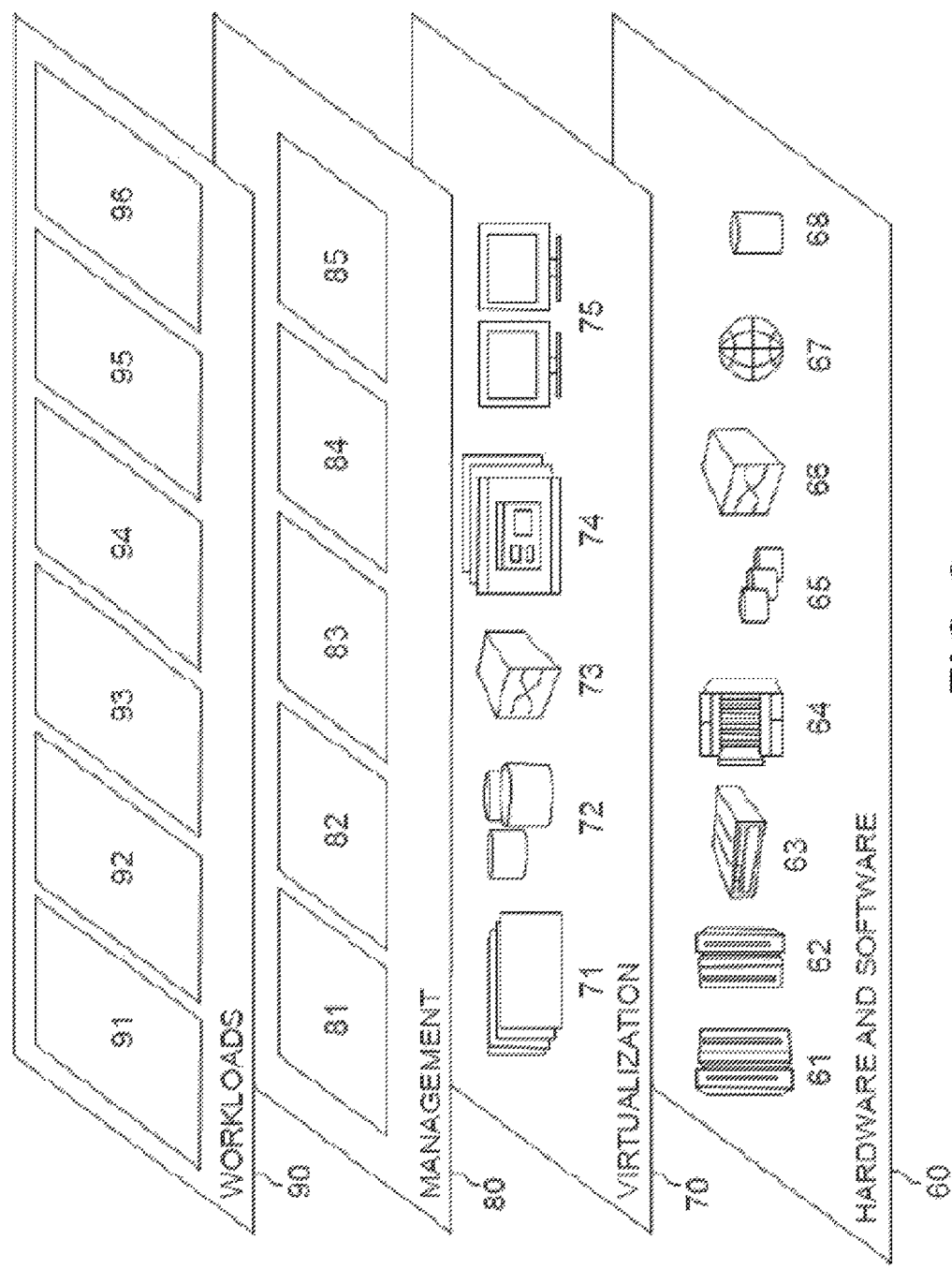
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and group inference based upon venue zone events 96.

Figure 4:
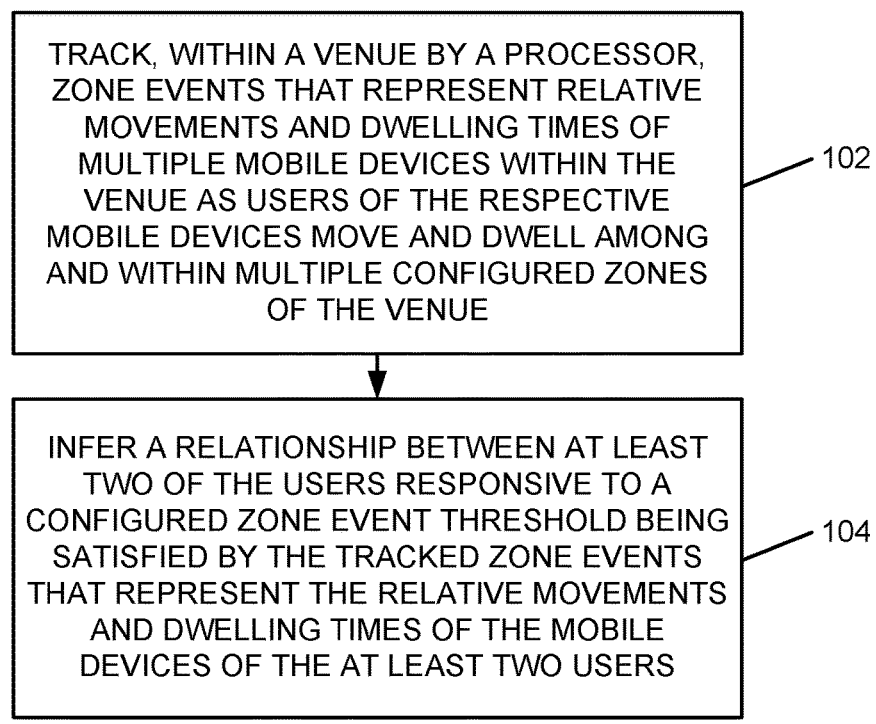
FIG. 4 is a flow chart of an example of an implementation of a process for group inference based upon venue zone events according to an embodiment of the present subject matter.
Figure 5:
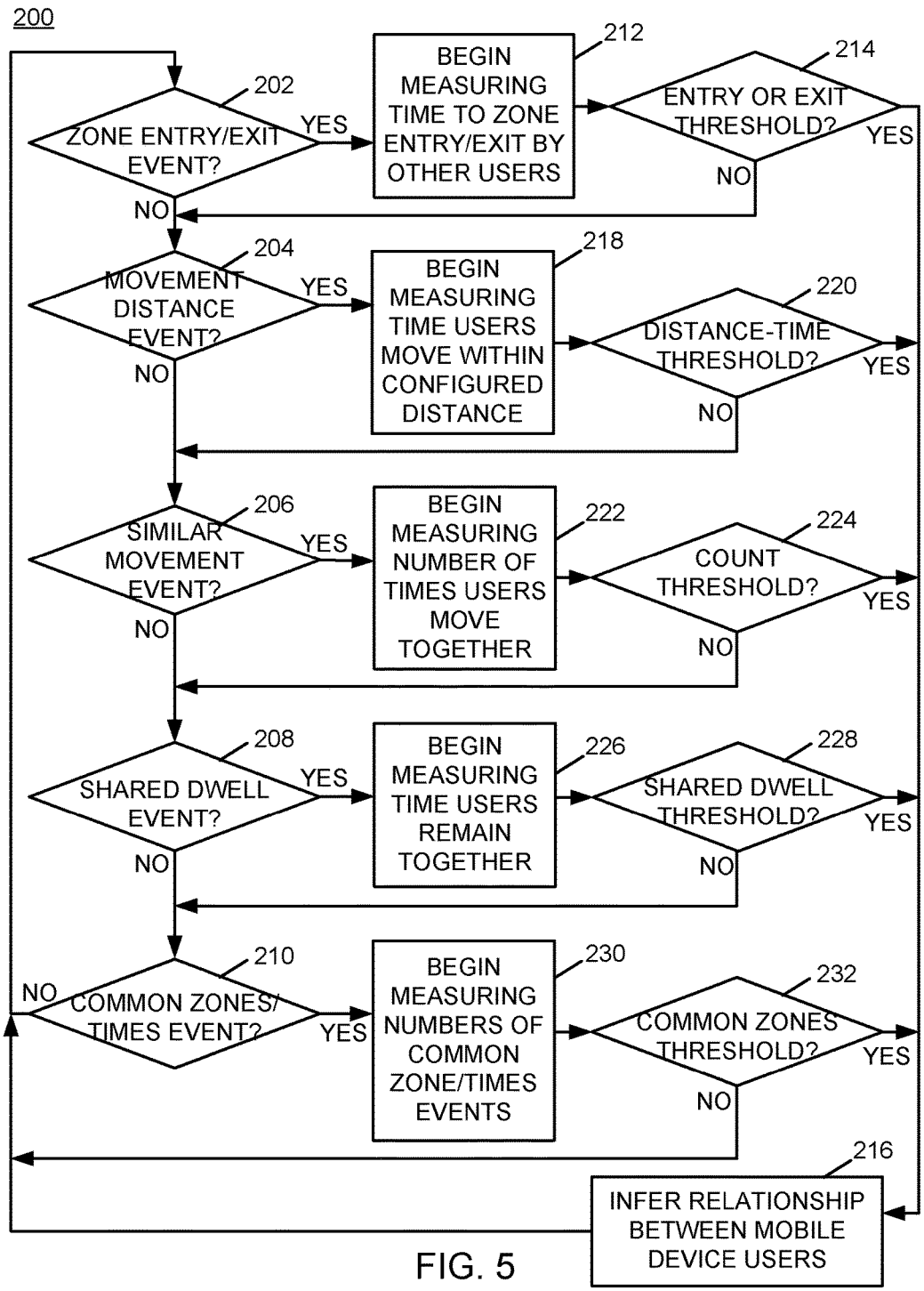
FIG. 5 is a flow chart of an example of an implementation of a process for group inference based upon venue zone events that further infers groups of users according to multiple different and granular venue zone events according to an embodiment of the present subject matter.

FIG. 4 through FIG. 5 described below represent example processes that may be executed by devices, such as the cloud computing node 10, to perform the automated group inference based upon venue zone events associated with the present subject matter. Many other variations on the example processes are possible and all are considered within the scope of the present subject matter. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 100 for group inference based upon venue zone events. The process 100 represents a computer-implemented method of performing the subject matter described herein. At block 102, the process 100 tracks, within a venue by a processor, zone events that represent relative movements and dwelling times of multiple mobile devices within the venue as users of the respective mobile devices move and dwell among and within multiple configured zones of the venue. At block 104, the process 100 infers a relationship between at least two of the users responsive to a configured zone event threshold being satisfied by the tracked zone events that represent the relative movements and dwelling times of the mobile devices of the at least two users.

FIG. 5 is a flow chart of an example of an implementation of a process 200 for group inference based upon venue zone events that further infers groups of users according to multiple different and granular venue zone events. The process 200 represents a computer-implemented method of performing the subject matter described herein. It should be noted that the process 200 is depicted and described as a single flowchart for ease of illustration and description purposes. However, it should additionally be noted that the process 200 is considered to be re-entrant and multi-threaded responsive to any of the representative events. This re-entrant and multi-threaded processing is not separately illustrated to reduce complexity within the drawing and description, though it is further understood that detected zone events work in conjunction with detection of additional similar zone events as appropriate for a given zone event and a given implementation of the process 200.

It should be noted that to avoid further crowding within the drawing, zone entry and zone exit events are combined in the drawing and description. However, it should further be understood that the processing associated with these two distinct forms of events may be performed either independently or in a combined manner, and may further be combined with other zone event processing, each as appropriate for a given implementation.

At decision point 202, the process 200 begins higher-level iterative processing to detect different zone events. Affirmative processing at each decision point of the higher-level iterative processing will be deferred and described in more detail further below in favor of an initial description of the higher-level iterative processing for detection of different zone events.

As such, at decision point 202, the process 200 makes a determination as to whether either a zone entry event or a zone exit event has been detected responsive to a user either entering a zone or exiting a zone of a venue. In response to determining that a zone entry event or a zone exit event has not been detected, the process 200 makes a determination at decision point 204 as to whether a zone movement distance event has been detected responsive to multiple users beginning to move together within a configured distance. In response to determining that a zone movement distance event has not been detected, the process 200 makes a determination at decision point 206 as to whether a similar movement event has been detected responsive to users making a similar movement within a venue (perhaps irrespective of a particular distance between the users and/or the timing of zone entries). In response to determining that a similar movement event has not been detected, the process 200 makes a determination at decision point 208 as to whether a shared dwell event has been detected responsive to multiple users becoming stationary (e.g., standing) together within a venue. In response to determining that a shared dwell event has not been detected, the process 200 makes a determination at decision point 210 as to whether a common zones at common times event has been detected responsive to users being repeatedly detected within the same zones of a venue (e.g., multiple zone overlaps, again, perhaps irrespective of a particular distance between the users and/or the timing of zone entries). In response to determining that a common zone event has not been detected, the process 200 returns to decision point 202 and iterates as described above.

Returning to the description of decision point 202, in response to determining that either a zone entry event or a zone exit event has been detected responsive to a user either entering a zone or exiting a zone of a venue, the process 200 begins measuring time to zone entry and/or time to zone exit by other users, respectively, at block 212. At decision point 214, the process 200 makes a determination as to whether at least one other user enters the same zone or exits the same zone within one of a configured zone entry time threshold or a configured zone exit time threshold, as appropriate according to the respective detected zone entry event or zone exit event. The configured zone entry time threshold defines a minimum time after a first user enters a zone of the venue within which a second user must enter the zone to infer the relationship between the first user and the second user. The configured zone exit time threshold defines a minimum time after a first user exits a zone of the venue within which a second user must exit the zone to infer the relationship between the first user and the second user. In response to determining that no other user enters the same zone within the configured zone entry time threshold or that no other user exits the same zone within the configured zone exit time threshold, the process 200 determines that no group is available to be inferred from the respective zone entry event or zone exit event, and the process 200 returns to decision point 204 and iterates as described above. Alternatively, in response to determining at decision point 214 that at least one other user enters the same zone within the configured zone entry time threshold or that at least one other user exits the same zone within the configured zone exit time threshold, the process 200 infers a relationship between the respective mobile device users at block 216. As such, the process 200 infers the relationship between the users responsive one of the users entering a zone of the venue and other users entering the zone of the venue within the defined minimum time that satisfies the configured zone entry time threshold. The process 200 also infers the relationship between the users responsive one of the users exiting a zone of the venue and other users exiting the zone of the venue within the defined minimum time that satisfies the configured zone exit time threshold. The process 200 returns to decision point 202 and iterates as described above. The process 200 may alternatively return to decision point 204 as appropriate for a given implementation.

Returning to the description of decision point 204, in response to determining that a zone movement distance event has been detected responsive to multiple users beginning to move together within a configured distance, the process 200 begins measuring time that the users move together at block 218. At decision point 220, the process 200 makes a determination as to whether the users move together within the configured distance for a configured movement distance-time threshold. The configured movement distance-time threshold defines a minimum distance within which a first user and a second user must remain for a minimum time to infer the relationship between the first user and the second user. In response to determining that the users do not move together within the configured distance for the configured movement distance-time threshold, the process 200 determines that no group is available to be inferred from the zone event and returns to decision point 206 and iterates as described above. Alternatively, in response to determining at decision point 220 that at least two users move together within the configured distance for the configured movement distance-time threshold, the process 200 infers a relationship between the respective mobile device users at block 216. As such, the process 200 infers the relationship between users responsive the users moving among and within the venue while remaining within a minimum distance of each other for the defined minimum time that satisfies the configured movement distance-time threshold. The process 200 returns to decision point 202 and iterates as described above. The process 200 may alternatively return to decision point 206 as appropriate for a given implementation.

Returning to the description of decision point 206, in response to determining that a similar movement event has been detected responsive to users making a similar movement within a venue (perhaps irrespective of a particular distance between the users and/or the timing of zone entries), the process 200 begins measuring the number of times that the users move together at block 222. At decision point 224, the process 200 makes a determination as to whether the users move together for a configured similar movement count threshold. The configured similar movement count threshold defines a minimum number of similar movements within the venue that a first user and a second user must make to infer the relationship between the first user and the second user. In response to determining that the users do not move together for the configured similar movement count threshold, the process 200 determines that no group is available to be inferred from the zone event and returns to decision point 208 and iterates as described above. Alternatively, in response to determining at decision point 224 that at least two users move together for the configured similar movement count threshold, the process 200 infers a relationship between the respective mobile device users at block 216. As such, the process 200 infers the relationship between at least two of the users responsive the users moving together within the venue for the defined minimum number of similar movements that satisfies the configured similar movement count threshold. The process 200 returns to decision point 202 and iterates as described above. The process 200 may alternatively return to decision point 208 as appropriate for a given implementation.

Returning to the description of decision point 208, in response to determining that a shared dwell event has been detected responsive to multiple users becoming stationary (e.g., standing) together within a venue, the process 200 begins measuring time that the users remain (e.g., dwell—stand, sit, etc.) together at block 226. At decision point 228, the process 200 makes a determination as to whether the users remain together for a configured shared dwell time threshold. The configured shared dwell time threshold defines a minimum amount of time that a first user and a second user must remain stationary and together within the venue to infer the relationship between the first user and the second user. In response to determining that the users do not remain stationary and together for the configured shared dwell time threshold, the process 200 determines that no group is available to be inferred from the zone event and returns to decision point 210 and iterates as described above. Alternatively, in response to determining at decision point 228 that at least two users remain stationary and together for the configured shared dwell time threshold, the process 200 infers a relationship between the respective mobile device users at block 216. As such, the process 200 infers the relationship between the users responsive the users remaining stationary and together within the venue for the defined minimum amount of time that satisfies the configured shared dwell time threshold. The process 200 returns to decision point 202 and iterates as described above. The process 200 may alternatively return to decision point 210 as appropriate for a given implementation.

Returning to the description of decision point 210, in response to determining that a common zones at common times event has been detected responsive to users being repeatedly detected within the same zones of a venue (e.g., multiple zone overlaps, again, perhaps irrespective of a particular distance between the users and/or the timing of zone entries), the process 200 begins measuring a number of common zones at common times events for the users at block 230. At decision point 232, the process 200 makes a determination as to whether the users have repeatedly shared common zones at common times for a configured common zones at common times threshold. The configured common zones at common times threshold defines a minimum number of zones of the venue that a first user and a second user must be in together to infer the relationship between the first user and the second user. For example, the configured common zones at common times threshold may specify that if users share the same venue zones for a certain percentage of time (e.g., fifty percent (50%), etc.), then a relationship may be inferred between the users. In response to determining that the users have not repeatedly shared common zones at common times for the configured common zones at common times threshold, the process 200 determines that no group is available to be inferred from the zone event and returns to decision point 202 and iterates as described above. Alternatively, in response to determining at decision point 232 that at least two users have repeatedly shared common zones at common times for the configured common zones at common times threshold, the process 200 infers a relationship between the respective mobile device users at block 216. As such, the process 200 infers the relationship between the users responsive to the users being together within a minimum number of zones of the venue that satisfies the configured common zones at common times threshold. The process 200 returns to decision point 202 and iterates as described above.

As such, the process 200 provides example processing for several different venue zone events that may be used to infer relationships between users of mobile devices, and to thereby perform group inference based upon venue zone events. The venue zone events may be defined granularly as appropriate for a particular implementation.

As described above in association with FIG. 1 through FIG. 5, the example systems and processes provide group inference based upon venue zone events. Many other variations and additional activities associated with group inference based upon venue zone events are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
by a processor;
establishing, using a plurality of short-distance wireless device location detection sensors that each detect real-time location and movement of multiple mobile devices relative to the respective short-distance wireless device location detection sensors, multiple configured zones within a venue, with each configured zone differentiated within the venue using at least one of the plurality of short-distance wireless device location detection sensors positioned within the venue;
tracking, by detecting the real-time location and movement of the multiple mobile devices relative to the plurality of short-distance wireless device location detection sensors positioned within the venue, real-time zone events that represent (1) differences of relative real-time movements of the multiple mobile devices within the venue, (2) coincident similar real-time movements of the multiple mobile devices within the venue, and (3) measured dwelling times of the multiple mobile devices within the venue as users of the respective mobile devices (i) move across boundaries of, (ii) move within, and (iii) dwell within the multiple configured zones of the venue; and
inferring a relationship between at least two of the users responsive to a configured zone event threshold being satisfied by the tracked real-time zone events that represent (1) the differences of the relative real-time movements of the multiple mobile devices within the venue, (2) the coincident similar real-time movements of the multiple mobile devices within the venue, and (3) the measured dwelling times of the mobile devices of the at least two users.

2. The computer-implemented method of claim 1, where:
the configured zone event threshold comprises one of:
a configured zone entry time threshold that defines a minimum time after a first user enters a configured zone of the venue within which a second user must enter the configured zone to infer the relationship between the first user and the second user; and
a configured zone exit time threshold that defines a minimum time after a first user exits the configured zone of the venue within which a second user must exit the configured zone to infer the relationship between the first user and the second user; and
inferring the relationship between the at least two of the users responsive to the configured zone event threshold being satisfied by the tracked real-time zone events comprises:
where the configured zone event threshold comprises the configured zone entry time threshold, inferring the relationship between the at least two of the users responsive to one of the at least two users entering the configured zone of the venue and another of the at least two users entering the configured zone of the venue within the defined minimum time that satisfies the configured zone entry time threshold; and
where the configured zone event threshold comprises the configured zone exit time threshold, inferring the relationship between the at least two of the users responsive to one of the at least two users exiting the configured zone of the venue and another of the at least two users exiting the configured zone of the venue within the defined minimum time that satisfies the configured zone exit time threshold.

3. The computer-implemented method of claim 1, where:
the configured zone event threshold comprises a configured movement distance-time threshold that defines a minimum distance from each other that a first user and a second user must remain for a minimum time while (i) moving across the boundaries of and (ii) moving within the multiple configured zones of the venue to infer the relationship between the first user and the second user; and
inferring the relationship between the at least two of the users responsive to the configured zone event threshold being satisfied by the tracked real-time zone events comprises:
inferring the relationship between the at least two of the users responsive to the at least two users remaining within the defined minimum distance from each other for the minimum time while (i) moving across the boundaries of and (ii) moving within the multiple configured zones of the venue that satisfies the configured movement distance-time threshold.

4. The computer-implemented method of claim 1, where:
the configured zone event threshold comprises a configured similar real-time movement count threshold that defines a minimum number of the coincident similar real-time movements (i) across the boundaries of and (ii) within the multiple configured zones of the venue that a first user and a second user must make to infer the relationship between the first user and the second user; and inferring the relationship between the at least two of the users responsive to the configured zone event threshold being satisfied by the tracked real-time zone events comprises:
  inferring the relationship between the at least two of the users responsive to the at least two users moving together for the defined minimum number of the coincident similar real-time movements (i) across the boundaries of and (ii) within the multiple configured zones of the venue that satisfies the configured similar real-time movement count threshold.

5. The computer-implemented method of claim 1, where:
the configured zone event threshold comprises a configured shared dwell time threshold that defines a minimum amount of time that a first user and a second user must remain together within the multiple configured zones of the venue to infer the relationship between the first user and the second user; and
inferring the relationship between the at least two of the users responsive to the configured zone event threshold being satisfied by the tracked real-time zone events comprises:
  inferring the relationship between the at least two of the users responsive to the at least two users remaining together for the defined minimum amount of time within the multiple configured zones of the venue that satisfies the configured shared dwell time threshold.

6. The computer-implemented method of claim 1, where:
the configured zone event threshold comprises a configured common zones at common times threshold that defines a minimum number of the multiple configured zones of the venue that a first user and a second user must be in together to infer the relationship between the first user and the second user; and
inferring the relationship between the at least two of the users responsive to the configured zone event threshold being satisfied by the tracked real-time zone events comprises:
  inferring the relationship between the at least two of the users responsive to the at least two users being together in the defined minimum number of the multiple configured zones of the venue that satisfies the configured common zones at common times threshold.

7. The computer-implemented method of claim 1, where the at least one of the tracking and the inferring are provided as part of a service in a cloud environment.

8. A system, comprising:
a memory; and
a processor programmed to:
  establish, using a plurality of short-distance wireless device location detection sensors that each detect real-time location and movement of multiple mobile devices relative to the respective short-distance wireless device location detection sensors, multiple configured zones within a venue, with each configured zone differentiated within the venue using at least one of the plurality of short-distance wireless device location detection sensors positioned within the venue;
  track, by detecting the real-time location and movement of the multiple mobile devices relative to the plurality of short-distance wireless device location detection sensors positioned within the venue, real-time zone events that represent (1) differences of relative real-time movements of the multiple mobile devices within the venue, (2) coincident similar real-time movements of the multiple mobile devices within the venue, and (3) measured dwelling times of the multiple mobile devices within the venue as users of the respective mobile devices (i) move across boundaries of, (ii) move within, and (iii) dwell within the multiple configured zones of the venue; and
  infer within the memory a relationship between at least two of the users responsive to a configured zone event threshold being satisfied by the tracked real-time zone events that represent (1) the differences of the relative real-time movements of the multiple mobile devices within the venue, (2) the coincident similar real-time movements of the multiple mobile devices within the venue, and (3) the measured dwelling times of the mobile devices of the at least two users.

9. The system of claim 8, where:
the configured zone event threshold comprises one of:
  a configured zone entry time threshold that defines a minimum time after a first user enters a configured zone of the venue within which a second user must enter the configured zone to infer the relationship between the first user and the second user; and
  a configured zone exit time threshold that defines a minimum time after a first user exits the configured zone of the venue within which a second user must exit the configured zone to infer the relationship between the first user and the second user; and
in being programmed to infer within the memory the relationship between the at least two of the users responsive to the configured zone event threshold being satisfied by the tracked real-time zone events, the processor is programmed to:
  where the configured zone event threshold comprises the configured zone entry time threshold, infer within the memory the relationship between the at least two of the users responsive to one of the at least two users entering the configured zone of the venue and another of the at least two users entering the configured zone of the venue within the defined minimum time that satisfies the configured zone entry time threshold; and
  where the configured zone event threshold comprises the configured zone exit time threshold, infer within the memory the relationship between the at least two of the users responsive to one of the at least two users exiting the configured zone of the venue and another of the at least two users exiting the configured zone of the venue within the defined minimum time that satisfies the configured zone exit time threshold.

10. The system of claim 8, where:
the configured zone event threshold comprises a configured movement distance-time threshold that defines a minimum distance from each other that a first user and a second user must remain for a minimum time while (i) moving across the boundaries of and (ii) moving within the multiple configured zones of the venue to infer the relationship between the first user and the second user; and
in being programmed to infer within the memory the relationship between the at least two of the users responsive to the configured zone event threshold being satisfied by the tracked real-time zone events, the processor is programmed to:

infer within the memory the relationship between the at least two of the users responsive to the at least two users remaining within the defined minimum distance from each other for the minimum time while (i) moving across the boundaries of and (ii) moving within the multiple configured zones of the venue that satisfies the configured movement distance-time threshold.

11. The system of claim 8, where:

the configured zone event threshold comprises a configured similar real-time movement count threshold that defines a minimum number of the coincident similar real-time movements (i) across the boundaries of and (ii) within the multiple configured zones of the venue that a first user and a second user must make to infer the relationship between the first user and the second user; and in being programmed to infer within the memory the relationship between the at least two of the users responsive to the configured zone event threshold being satisfied by the tracked real-time zone events, the processor is programmed to:

infer within the memory the relationship between the at least two of the users responsive to the at least two users moving together for the defined minimum number of the coincident similar real-time movements (i) across the boundaries of and (ii) within the multiple configured zones of the venue that satisfies the configured similar real-time movement count threshold.

12. The system of claim 8, where:

the configured zone event threshold comprises a configured shared dwell time threshold that defines a minimum amount of time that a first user and a second user must remain together within the multiple configured zones of the venue to infer the relationship between the first user and the second user; and in being programmed to infer within the memory the relationship between the at least two of the users responsive to the configured zone event threshold being satisfied by the tracked real-time zone events, the processor is programmed to:

infer within the memory the relationship between the at least two of the users responsive to the at least two users remaining together for the defined minimum amount of time within the multiple configured zones of the venue that satisfies the configured shared dwell time threshold.

13. The system of claim 8, where:

the configured zone event threshold comprises a configured common zones at common times threshold that defines a minimum number of the multiple configured zones of the venue that a first user and a second user must be in together to infer the relationship between the first user and the second user; and in being programmed to infer within the memory the relationship between the at least two of the users responsive to the configured zone event threshold being satisfied by the tracked real-time zone events, the processor is programmed to:

infer within the memory the relationship between the at least two of the users responsive to the at least two users being together in the defined minimum number of the multiple configured zones of the venue that satisfies the configured common zones at common times threshold.

14. A computer program product, comprising:

a computer readable storage medium having computer readable program code embodied therewith, where the computer readable storage medium is not a transitory signal per se and where the computer readable program code when executed on a computer causes the computer to:

establish, using a plurality of short-distance wireless device location detection sensors that each detect real-time location and movement of multiple mobile devices relative to the respective short-distance wireless device location detection sensors, multiple configured zones within a venue, with each configured zone differentiated within the venue using at least one of the plurality of short-distance wireless device location detection sensors positioned within the venue;

track, by detecting the real-time location and movement of the multiple mobile devices relative to the plurality of short-distance wireless device location detection sensors positioned within the venue, real-time zone events that represent (1) differences of relative real-time movements of the multiple mobile devices within the venue, (2) coincident similar real-time movements of the multiple mobile devices within the venue, and (3) measured dwelling times of the multiple mobile devices within the venue as users of the respective mobile devices (i) move across boundaries of, (ii) move within, and (iii) dwell within the multiple configured zones of the venue; and infer a relationship between at least two of the users responsive to a configured zone event threshold being satisfied by the tracked real-time zone events that represent (1) the differences of the relative real-time movements of the multiple mobile devices within the venue, (2) the coincident similar real-time movements of the multiple mobile devices within the venue, and (3) the measured dwelling times of the mobile devices of the at least two users.

15. The computer program product of claim 14, where:

the configured zone event threshold comprises one of:

a configured zone entry time threshold that defines a minimum time after a first user enters a configured zone of the venue within which a second user must enter the configured zone to infer the relationship between the first user and the second user; and a configured zone exit time threshold that defines a minimum time after a first user exits the configured zone of the venue within which a second user must exit the configured zone to infer the relationship between the first user and the second user; and in causing the computer to infer the relationship between the at least two of the users responsive to the configured zone event threshold being satisfied by the tracked real-time zone events, the computer readable program code when executed on the computer causes the computer to:

where the configured zone event threshold comprises the configured zone entry time threshold, infer the relationship between the at least two of the users responsive to one of the at least two users entering the configured zone of the venue and another of the at least two users entering the configured zone of the venue within the defined minimum time that satisfies the configured zone entry time threshold; and where the configured zone event threshold comprises the configured zone exit time threshold, infer the relationship between the at least two of the users responsive to one of the at least two users exiting the configured zone of the venue and another of the at least two users exiting the configured zone of the venue within the defined minimum time that satisfies the configured zone exit time threshold.

16. The computer program product of claim 14, where:

the configured zone event threshold comprises a configured movement distance-time threshold that defines a minimum distance from each other that a first user and a second user must remain for a minimum time while (i) moving across the boundaries of and (ii) moving within the multiple configured zones of the venue to infer the relationship between the first user and the second user; and in causing the computer to infer the relationship between the at least two of the users responsive to the configured zone event threshold being satisfied by the tracked real-time zone events, the computer readable program code when executed on the computer causes the computer to:

infer the relationship between the at least two of the users responsive to the at least two users remaining within the defined minimum distance from each other for the minimum time while (i) moving across the boundaries of and (ii) moving within the multiple configured zones of the venue that satisfies the configured movement distance-time threshold.

17. The computer program product of claim 14, where:

the configured zone event threshold comprises a configured similar real-time movement count threshold that defines a minimum number of the coincident similar real-time movements (i) across the boundaries of and (ii) within the multiple configured zones of the venue that a first user and a second user must make to infer the relationship between the first user and the second user; and in causing the computer to infer the relationship between the at least two of the users responsive to the configured zone event threshold being satisfied by the tracked real-time zone events, the computer readable program code when executed on the computer causes the computer to:

infer the relationship between the at least two of the users responsive to the at least two users moving together for the defined minimum number of the coincident similar real-time movements (i) across the boundaries of and (ii) within the multiple configured zones of the venue that satisfies the configured similar real-time movement count threshold.

18. The computer program product of claim 14, where:

the configured zone event threshold comprises a configured shared dwell time threshold that defines a minimum amount of time that a first user and a second user must remain together within the multiple configured zones of the venue to infer the relationship between the first user and the second user; and in causing the computer to infer the relationship between the at least two of the users responsive to the configured zone event threshold being satisfied by the tracked real-time zone events, the computer readable program code when executed on the computer causes the computer to:

infer the relationship between the at least two of the users responsive to the at least two users remaining together for the defined minimum amount of time within the multiple configured zones of the venue that satisfies the configured shared dwell time threshold.

19. The computer program product of claim 14, where:

the configured zone event threshold comprises a configured common zones at common times threshold that defines a minimum number of the multiple configured zones of the venue that a first user and a second user must be in together to infer the relationship between the first user and the second user; and in causing the computer to infer the relationship between the at least two of the users responsive to the configured zone event threshold being satisfied by the tracked real-time zone events, the computer readable program code when executed on the computer causes the computer to:

infer the relationship between the at least two of the users responsive to the at least two users being together in the defined minimum number of the multiple configured zones of the venue that satisfies the configured common zones at common times threshold.

20. The computer program product of claim 14, where the at least one of the track and the infer are provided as part of a service in a cloud environment.

\* \* \* \* \*